United States Patent
Juay et al.

(10) Patent No.: US 12,093,842 B2
(45) Date of Patent: Sep. 17, 2024

(54) AUTOMATED REGRESSION DETECTION FRAMEWORK FOR SUPPORTING ROBUST VERSION CHANGES OF MACHINE LEARNING APPLICATIONS

(71) Applicant: SAP SE, Walldorf (DE)

(72) Inventors: Kai Xun Juay, Singapore (SG); Denny Jee King Gee, Singapore (SG)

(73) Assignee: SAP SE, Walldorf (DE)

( * ) Notice: Subject to any disclaimer, the term of this patent is extended or adjusted under 35 U.S.C. 154(b) by 993 days.

(21) Appl. No.: 17/008,808

(22) Filed: Sep. 1, 2020

(65) Prior Publication Data
US 2022/0067548 A1    Mar. 3, 2022

(51) Int. Cl.
*G06N 5/04* (2023.01)
*G06N 20/00* (2019.01)

(52) U.S. Cl.
CPC ............ *G06N 5/04* (2013.01); *G06N 20/00* (2019.01)

(58) Field of Classification Search
CPC ........... G06N 5/04; G06N 20/00; G06N 5/00; G06N 5/042; G06N 20/10; G06N 20/20
See application file for complete search history.

(56) References Cited

U.S. PATENT DOCUMENTS

| | | | |
|---|---|---|---|
| 11,538,048 B1* | 12/2022 | Nahta | G06N 3/0985 |
| 11,599,752 B2* | 3/2023 | Briancon | G06Q 10/067 |
| 11,763,950 B1* | 9/2023 | Larson | G06N 20/20 705/3 |
| 2016/0140442 A1* | 5/2016 | Lee | G06N 20/00 |
| 2020/0012962 A1* | 1/2020 | Dent | G06F 9/5011 |
| 2020/0081814 A1* | 3/2020 | Srinivasan | G06F 8/71 |
| 2020/0272559 A1* | 8/2020 | Ahluwalia | G06N 20/00 |
| 2020/0371902 A1* | 11/2020 | Mangione-Tran | G06F 11/3688 |
| 2021/0248503 A1* | 8/2021 | Hickey | G06F 18/2113 |
| 2021/0350330 A1* | 11/2021 | Howard, Jr. | G06N 20/00 |

OTHER PUBLICATIONS

Coelho et al., "Unit testing in multi-agent systems using mock agents and aspects." Proceedings of the 2006 international workshop on Software engineering for large-scale multi-agent systems, May 2006, 20 pages.

Jimenez et al., "Quiho: Automated performance regression testing using inferred resource utilization profiles." Proceedings of the 2018 ACM/SPEC International Conference on Performance Engineering, Mar. 2018, 12 pages.

(Continued)

*Primary Examiner* — Shane D Woolwine
(74) *Attorney, Agent, or Firm* — Fish & Richardson P.C.

(57) ABSTRACT

Methods, systems, and computer-readable storage media for receiving a project structure representing a regression test file directory for regression inference and including a set of test scenarios, determining that a test scenario of the set of test scenarios is to be executed, transmitting a request for a test inference job to be executed using a second version of the application, the test inference job representing the test scenario, receiving a set of actual results of the test inference job, calculating a prediction score based on the set of actual results and a set of expected results of the test scenario, and selectively indicating regression of the one or more ML models of the test scenario based on the prediction score.

20 Claims, 5 Drawing Sheets

(56) References Cited

OTHER PUBLICATIONS

Jin et al., "Automated behavioral regression testing. 2010 Third international conference on software testing, verification and validation. IEEE," Apr. 2010, 10 pages.

Nguyen et al., "Automated detection of performance regressions using statistical process control techniques." Proceedings of the 3rd ACM/SPEC International Conference on Performance Engineering, Apr. 2012, 12 pages.

Non-Final Office Action issued in U.S. Appl. No. 16/408,609 on Jul. 14, 2021, 32 pages.

Pei et al., "Deepxplore: Automated whitebox testing of deep learning systems." proceedings of the 26th Symposium on Operating Systems Principles, Oct. 2017, 18 pages.

Bhattacharjee et al., "IBM Deep Learning System" IBM Journal of Research and Development 61.4/5, Sep. 2017, 22 pages.

Final Office Action in U.S. Appl. No. 16/408,609, mailed on Dec. 2, 2022, 23 pages.

Final Office Action in U.S. Appl. No. 16/408,609, mailed on Jan. 19, 2022, 27 pages.

Foo et al., "Mining Performance Regression Testing Repositories for Automated Performance Analysis" 2010 10th International Conference on Quality Software, Jul. 2010, 32-41.

Non-Final Office Action in U.S. Appl. No. 16/408,609, mailed on May 16, 2022, 31 pages.

U.S. Appl. No. 16/217,148, Saito et al., "Utilizing Embeddings for Efficient Matching of Entities," filed on Dec. 12, 2018, 29 pages.

\* cited by examiner

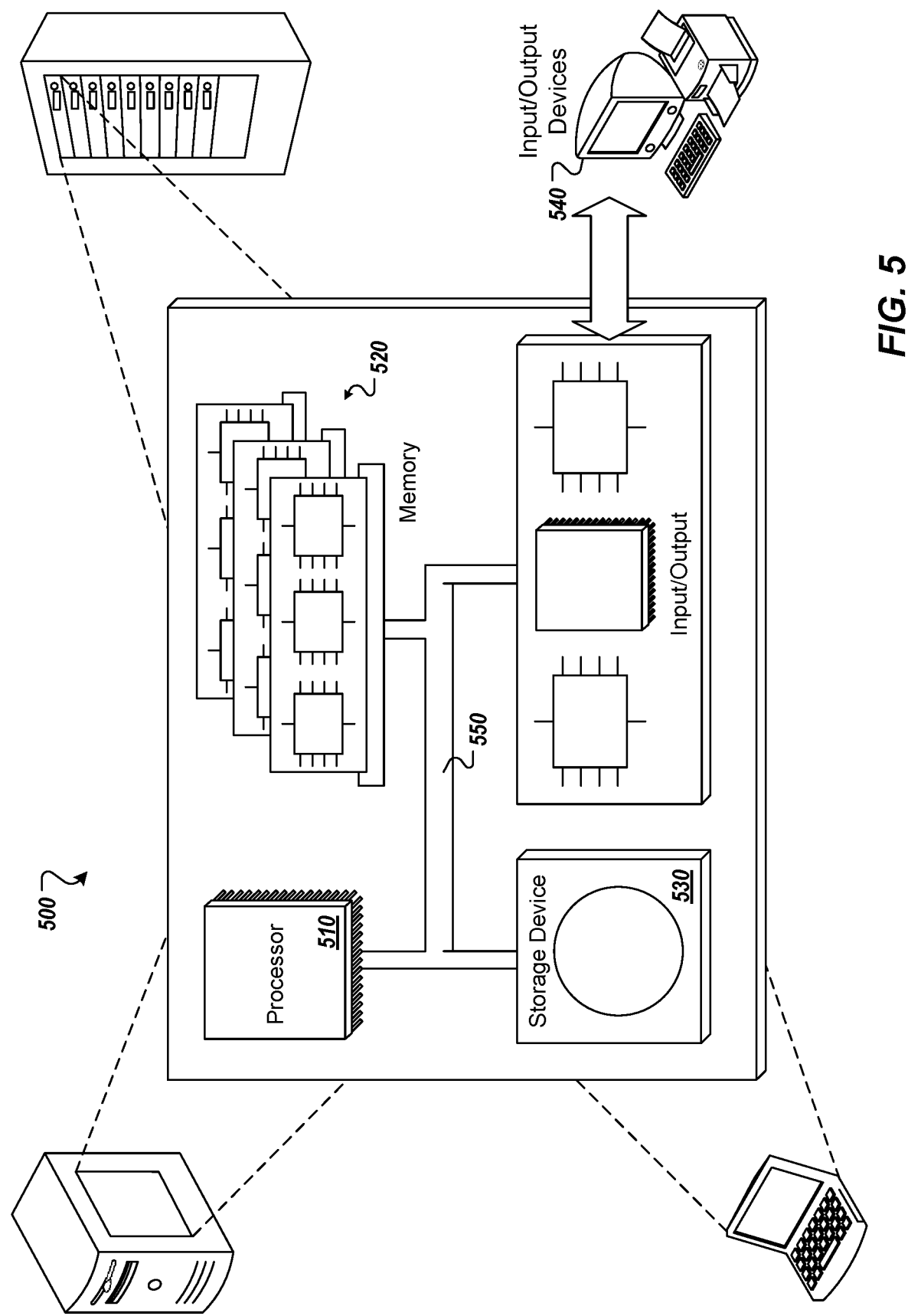

AUTOMATED REGRESSION DETECTION FRAMEWORK FOR SUPPORTING ROBUST VERSION CHANGES OF MACHINE LEARNING APPLICATIONS

BACKGROUND

Machine learning (ML) models can be used by applications to provide functionality. For example, input data can be provided to a ML model, which executes inference to provide a prediction as output. In some examples, the application can be provided to multiple entities, but uses ML models that are specific to each entity (e.g., ML models are trained using training data that is entity-specific). To achieve this, for an entity that uses the application, ML models are trained using training data that is specific to that entity (e.g., the training data represents how the entity performs activities that a ML model is to perform). In this manner, each entity can have entity-specific ML models that are leveraged when the entity interacts with the ML application.

In ML applications, the performance and accuracy of a ML model can be affected by changes in the application. For example, an application can go through a lifecycle, in which versions of the application change. For example, an application can be initially provided as a first version (V1). Subsequently, changes can be made to the application and the application can be provided as a second version (V2). However, a ML model that was trained and optimized for V1 can regress in V2. That is, the performance and/or accuracy of the ML model can degrade in V2 (e.g., as a result of changes in the source code and/or new packages introduced into the application between versions).

In traditional systems, such regression might only be able to be detected during the production stage (i.e., production use of V2 of the application). Further, traditional approaches to mitigating such regression can be time- and resource-inefficient. For example, one approach to addressing regression is to retrain the ML models for each version of the application. Such an approach, however, is inefficient in terms of time and technical resources expended, and can frustrate entity operations, as potentially significant downtime would be required. This is further compounded in instances where ML models are entity-specific. That is, retraining would be required for ML models of each entity that uses the application.

SUMMARY

Implementations of the present disclosure are directed to regression testing of machine learning (ML) models. More particularly, implementations of the present disclosure are directed to an automated regression detection framework for ML models to detect instances of regression based on version changes of applications.

In some implementations, actions include receiving a project structure representing a regression test file directory for regression inference and including a set of test scenarios, determining that a test scenario of the set of test scenarios is to be executed, transmitting a request for a test inference job to be executed using a second version of the application, the test inference job representing the test scenario, receiving a set of actual results of the test inference job, calculating a prediction score based on the set of actual results and a set of expected results of the test scenario, and selectively indicating regression of the one or more ML models of the test scenario based on the prediction score. Other implementations of this aspect include corresponding systems, apparatus, and computer programs, configured to perform the actions of the methods, encoded on computer storage devices.

These and other implementations can each optionally include one or more of the following features: determining that a test scenario of the set of test scenarios is to be executed includes determining that a set of files for execution of the test scenario is complete; selectively indicating regression of one or more ML models of the test scenario based on the prediction score; each test scenario in the set of test scenarios is specific to a respective entity, the one or more ML models being trained on entity-specific training data for a first version of the ML application; calculating a prediction score based on the actual result and an expected result of the test scenario includes determining a correct number of predictions by comparing actual results in the set of actual results to expected results in the set of expected results, the set of expected results being defined in the test scenario; selectively indicating regression of the one or more ML models of the test scenario based on the prediction score includes comparing the prediction score to an overall score that is included in the set of actual results; and the test inference job is executed prior to production use of the second version of the application.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 5 is a schematic illustration of example computer systems that can be used to execute implementations of the present disclosure.

Like reference symbols in the various drawings indicate like elements.

DETAILED DESCRIPTION

Figure 1:
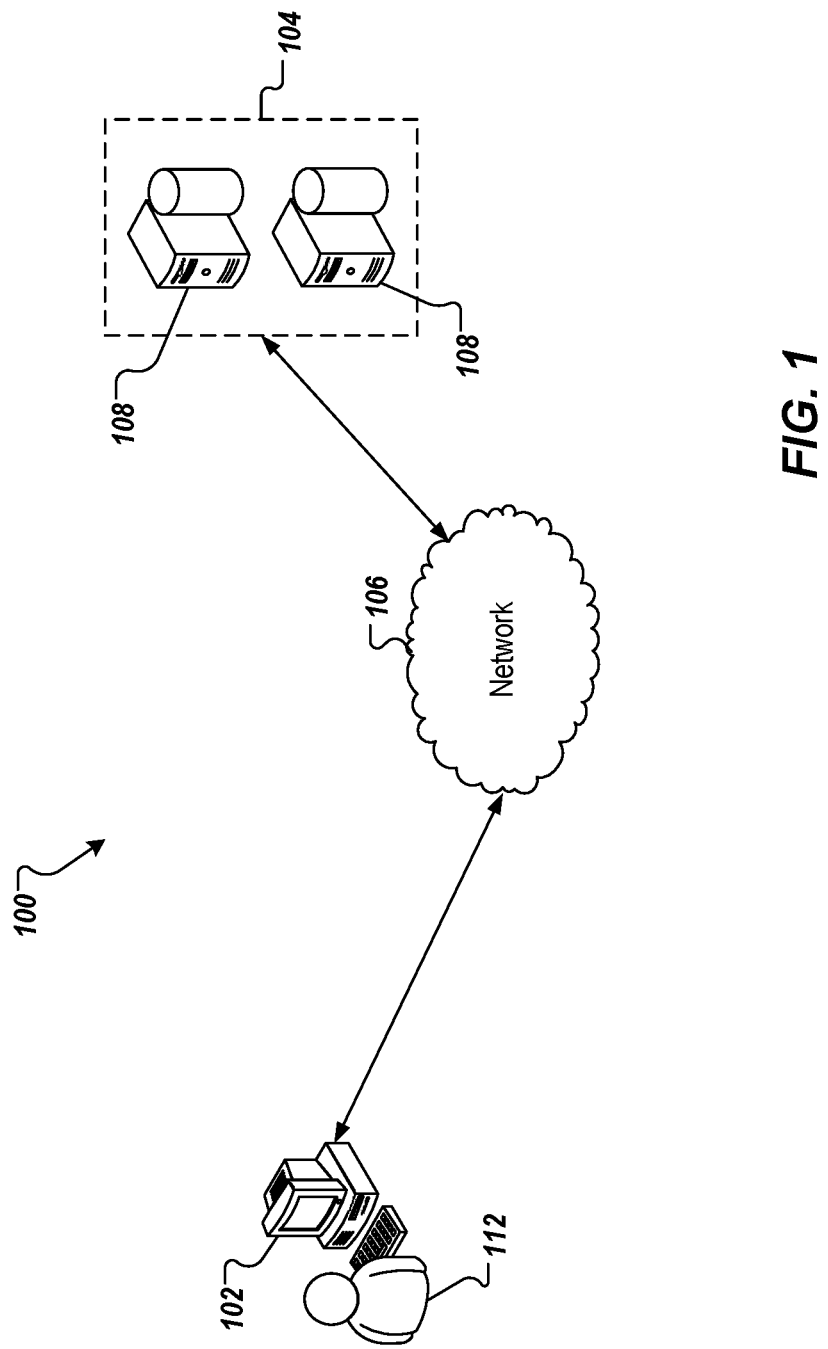
FIG. 1 depicts an example architecture that can be used to execute implementations of the present disclosure.

Implementations of the present disclosure are directed to regression testing of machine learning (ML) models. More particularly, implementations of the present disclosure are directed to an automated regression detection framework for ML models to detect instances of regression based on version changes of applications. Implementations can include actions of receiving a project structure representing a regression test file directory for regression inference and including a set of test scenarios, determining that a test scenario of the set of test scenarios is to be executed, transmitting a request for a test inference job to be executed using a second version of the application, the test inference job representing the test scenario, receiving a set of actual results of the test inference job, calculating a prediction score based on the set of actual results and a set of expected results of the test scenario, and selectively indicating regression of the one or more ML models of the test scenario based on the prediction score.

Implementations of the present disclosure are described in further detail herein with reference to an example application that leverages one or more ML models to provide functionality (referred to herein as a ML application). The example application includes SAP Cash Application (CashApp) provided by SAP SE of Walldorf, Germany. CashApp leverages ML models that are trained using a ML framework (e.g., SAP Leonardo Machine Learning) to learn accounting activities and to capture richer detail of customer and country-specific behavior. An example accounting activity can include matching payments to invoices for clearing of the invoices. For example, using an enterprise platform (e.g., SAP S/4 HANA), incoming payment information (e.g., recorded in bank statements) and open invoice information are passed to a matching engine, and, during inference, one or more ML models predict matches between bank statements and invoices. In some examples, matched invoices are either automatically cleared (auto-clearing) or suggested for review by a user (e.g., accounts receivable). Although CashApp is referred to herein for purposes of illustrating implementations of the present disclosure, it is contemplated that implementations of the present disclosure can be realized with any appropriate application that leverages one or more ML models.

To provide further context for implementations of the present disclosure, and as introduced above, ML models can be used by applications (also referred to herein as ML applications) to provide functionality for entities (e.g., customers of a software vendor that provides the ML application). For example, input data (e.g., payment data, invoice data) can be provided to a ML model, which executes inference to provide a prediction as output (e.g., a predicted match between a payment (bank statement) and an invoice). In some examples, the application can be provided to multiple customers (e.g., enterprises), but uses ML models that are specific to each customer (e.g., ML models are trained using training data that can be customer-specific). To achieve this, for a customer that uses the application, ML models are trained using training data that is specific to that customer (e.g., the training data represents how the customer performs activities that a ML model is to perform). In this manner, each customer can have customer-specific ML models that are leveraged when the customer interacts with the application. Using CashApp as an example, multiple customers (e.g., enterprises) can use CashApp, and ML models are trained according to each customer's specifications on how the respective customer matches invoices and bank statements.

In general, during training of a ML model, values of the parameters across layers of the ML model are iteratively changed in an effort to optimize a loss function. In general, ML models are iteratively trained, where, at each iteration, a loss value is determined based on a loss function. The loss value represents a degree of accuracy of the output of the ML model. In general, the loss value can be described as a representation of a degree of difference (or distance) between the output of the ML model and an expected output of the ML model, the expected output being provided from validation data (e.g., data that includes expected outputs for known inputs). In some examples, if the loss value does not meet an expected value (e.g., 0), parameters of the ML model are adjusted, and another iteration of training is performed. In some instances, this process is repeated until the loss value meets the expected value.

In ML applications, the performance (e.g., time and/or technical resources expended to perform inference) and accuracy (e.g., correct predictions) of a ML model can be affected by changes in the application. For example, an application can go through a lifecycle, in which versions of the application change. For example, an application can be initially provided as a first version (V1). Subsequently, changes can be made to the application and the application can be provided as a second version (V2). However, a ML model that was trained and optimized for V1 can regress in V2. That is, the performance and/or accuracy of the ML model can degrade in V2 (e.g., as a result of changes in the source code and/or new packages introduced into the application between versions). In traditional systems, such regression might only be able to be detected during the production stage (i.e., production use of V2 of the application).

In further detail, libraries in ML applications can be described as sets of routines and functions that are written in a particular programming language. A robust set of libraries can make it easier for developers to perform complex tasks without rewriting many lines of code. Libraries can also affect the performance and accuracy of ML models used in the applications. Because not all packages are compatible with each other, updates to an existing package and/or the introduction of new package can result in regression of ML models, and the application overall. As technology improves, packages used in ML applications are constantly upgraded (e.g., for security to prevent hackers from finding any exploits to the application). In some examples, libraries used to deserialize ML models might not be compatible with the exact same ML model that was used at the time of training. For example, a ML model provided in V1 might not be able to deserialize in V2 during inference. In traditional systems, such regression (inability to deserialize) might only be able to be detected during the production stage (i.e., production use of V2 of the application).

One approach to addressing regression is to retrain the ML models for each version of the application. Such an approach, however, is inefficient in terms of time and technical resources expended, and can frustrate customer operations, as potentially significant downtime would be required. This is further compounded in instances where ML models are customer-specific. That is, retraining would be required for all ML models of each customer that uses the application.

In view of the above context, implementations of the present disclosure provide an automated regression detection framework for ML models to detect instances of regression based on version changes of applications. As described in further detail herein, the regression detection framework of the present disclosure functions as an early detection system that enables all available ML models of an application to be tested to monitor for regression issues. This enables detection of any regression issues in the development stage (e.g., development of V2 of an application) to enable changes to be made to avoid instances of regression in the production stage (e.g., production use of V2). As described herein, implementations of the present disclosure provide efficiencies in terms of time, cost, and expenditure of technical resources that would have been wasted should regression issues arise in the production stage.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, the server system 104 can host a ML application that can be used by one or more customers (e.g., enterprises) to support customers in their operations. For example, the ML application can be provided as a cloud-based application that executes in a cloud infrastructure provided by a cloud service provider. In some examples, the ML application leverages multiple sets of ML models, each set of ML models including one or more ML models that is specific to a customer. For example, for a first customer, a first set of ML models is provided, each ML model being trained using training data that is specific to the first customer, and, for a second customer, a second set of ML models is provided, each ML model being trained using training data that is specific to the second customer. In this manner, when the first customer interacts with the ML application, the ML application uses the first set of ML models, and, when the second customer interacts with the ML application, the ML application uses the second set of ML models.

In accordance with implementations of the present disclosure, and as noted above, a regression detection framework is provided (e.g., hosted on the server system 104) to detect regression in ML models before production use of the ML models in a subsequent version of the ML application. For example, if the ML application is to migrate from V1 to V2 (e.g., upgraded to V2), the regression detection framework of the present disclosure can detect instances of regression in any of the ML models (i.e., across ML models of all customers) prior to production use of V2 of the ML application. In this manner, appropriate changes can be made to one or more ML models, for which regression is indicated, prior to production use of the one or more ML models.

Figure 2:
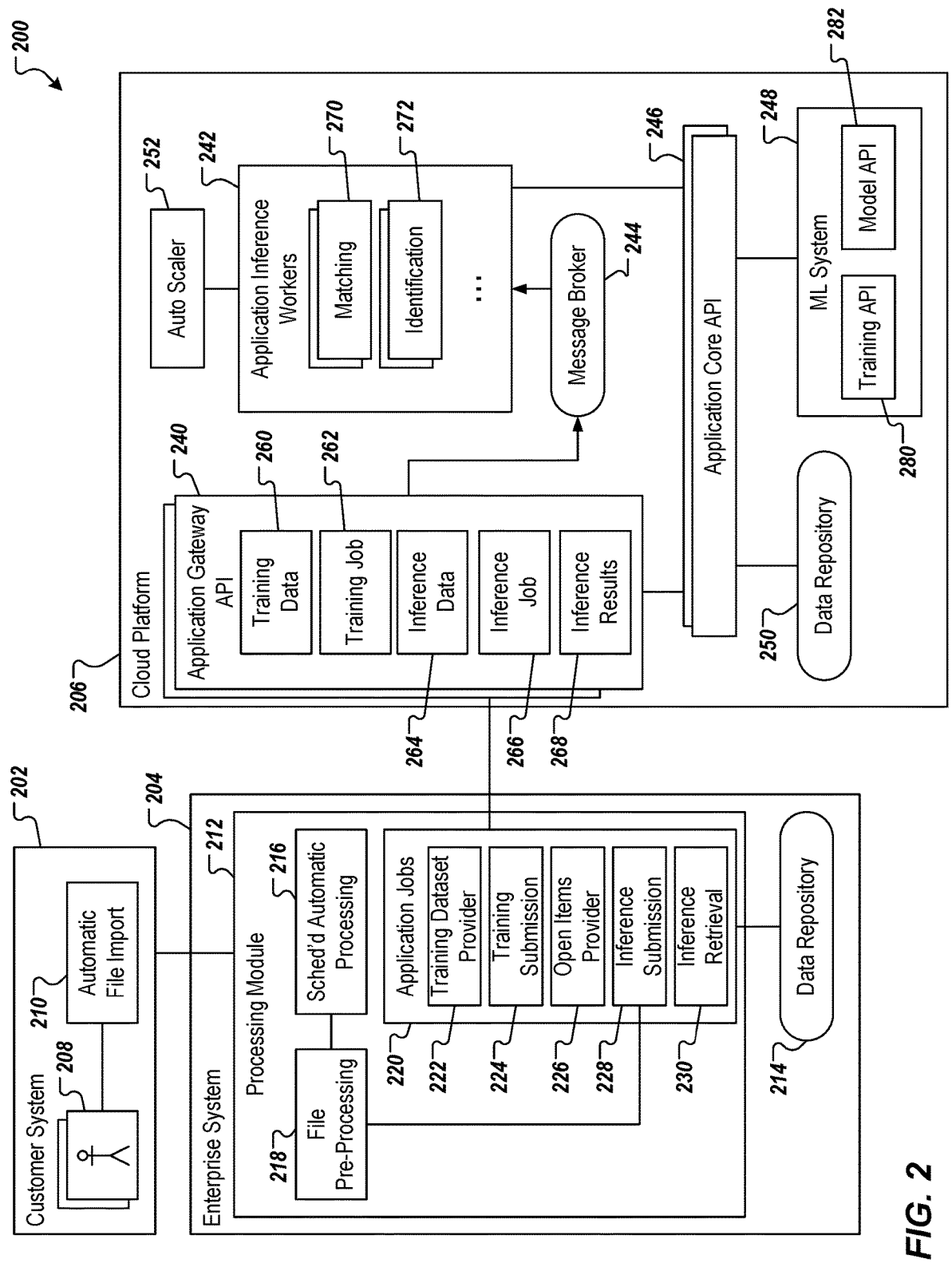
FIG. 2 depicts an example conceptual architecture in accordance with implementations of the present disclosure.

FIG. 2 depicts an example conceptual architecture 200 in accordance with implementations of the present disclosure. In the depicted example, the conceptual architecture 200 includes a customer system 202, an enterprise platform 204 (e.g., SAP S/4 HANA), and a cloud platform 206 (e.g., SAP Cloud Platform (Cloud Foundry)). As described in further detail herein, the enterprise platform 204 and the cloud platform 206 facilitate one or more ML applications that leverage ML models to provide functionality for one or more customers. In some examples, each customer interacts with the ML application(s) through a respective customer system 202. For purposes of illustration, and without limitation, the conceptual architecture 200 is discussed in further detail with reference to CashApp, introduced above. However, implementations of the present disclosure can be realized with any appropriate ML application.

In the example of FIG. 2, the customer system 202 includes one or more client devices 208 and a file import module 210. In some examples, a user (e.g., an employee of the customer) interacts with a client device 208 to import one or more data files to the enterprise platform 204 for processing by a ML application. For example, and in the context of CashApp, an invoice data file and a bank statement data file can be imported to the enterprise platform 204 from the customer system 202. In some examples, the invoice data file includes data representative of one or more invoices issued by the customer, and the bank statement data file includes data representative of one or more payments received by the customer. As another example, the one or more data files can include training data files that provide customer-specific training data for training of one or more ML models for the customer.

In the example of FIG. 2, the enterprise platform 204 includes a processing module 212 and a data repository 214. In the context of CashApp, the processing module 212 can include a finance-accounts receivable module. The processing module 212 includes a scheduled automatic processing module 216, a file pre-processing module 218, and an applications job module 220. In some examples, the scheduled automatic processing module 216 receives data files from the customer system 202 and schedules the data files for processing in one or more application jobs. The data files are pre-processed by the file pre-processing module 218 for consumption by the processing module 212.

Example application jobs can include, without limitation, training jobs and inference jobs. In some examples, a training job includes training of a ML model using a training file (e.g., that records customer-specific training data). In some examples, an inference job includes using a ML model to provide a prediction. In the context of CashApp, the training data can include invoice to bank statement matches as examples provided by a customer, which training data is used to train a ML model to predict invoice to bank statement matches. Also in the context of CashApp, the data files can include an invoice data file and a bank statement data file that are ingested by a ML model to predict matches between invoices and bank statements in an inference process.

With continued reference to FIG. 2, the application jobs module 220 includes a training dataset provider sub-module 222, a training submission sub-module 224, an open items provider sub-module 226, an inference submission sub-module 228, and an inference retrieval sub-module 230. In some examples, for a training job, the training dataset provider sub-module 222 and the training submission sub-module 224 function to request a training job from and provide training data to the cloud platform 206. In some examples, for an inference job, the training dataset provider sub-module 222 and the training submission sub-module 224 function to request a training job from and provide training data to the cloud platform 206.

In some implementations, the cloud platform 206 hosts at least a portion of the ML application (e.g., CashApp) to execute one or more jobs (e.g., training job, inference job). In the example of FIG. 2, the cloud platform 206 includes one or more application gateway application programming interfaces (APIs) 240, application inference workers 242 (e.g., matching worker 270, identification worker 272), a message broker 244, one or more application core APIs 246, a ML system 248, a data repository 250, and an auto-scaler 252. In some examples, the application gateway API 240 receives job requests from and provides job results to the enterprise system 204 (e.g., over a REST/HTTP [oAuth] connection). For example, the application gateway API 240 can receive training data 260 for a training job 262 that is executed by the ML system 248. As another example, the application gateway API 240 can receive inference data 264 (e.g., invoice data, bank statement data) for an inference job 266 that is executed by the application inference workers 242, which provide inference results 268 (e.g., predictions).

In some examples, the enterprise system 204 can request the training job 262 to train one or more ML models using the training data 262. In response, the application gateway API 240 sends a training request to the ML system 248 through the application core API 246. By way of non-limiting example, the ML system 248 can be provided as SAP Leonardo Machine Learning. In the depicted example, the ML system 248 includes a training API 280 and a model API 282. The ML system 248 trains a ML model using the training data. In some examples, the ML model is accessible for inference jobs through the model API 282.

In some examples, the enterprise system 204 can request the inference job 266 to provide the inference results 268, which includes a set of predictions from one or more ML models. In some examples, the application gateway API 240 sends an inference request, including the inference data 264, to the application inference workers 242 through the message broker 244. An appropriate inference worker of the application inference workers 242 handles the inference request. In the example context of matching invoices to bank statements, the matching worker 270 transmits an inference request to the ML system 248 through the application core API 246. The ML system 248 accesses the appropriate ML model (e.g., the ML model that is specific to the customer and that is used for matching invoices to bank statements), which generates the set of predictions. The set of predictions are provided back to the inference worker (e.g., the matching worker 270) and are provided back to the enterprise system 204 through the application gateway API 240 as the inference results 266. In some examples, the auto-scaler 252 functions to scale the inference workers up/down depending on the number of inference jobs submitted to the cloud platform 206.

In some implementations, at least a portion of the ML application executed by the cloud platform 206 can be affected by a version change (e.g., change from V1 to V2). As a result, regression of the performance and/or accuracy of an ML model that is leveraged by the ML application can occur, as described herein.

In view of this, the regression detection framework of the present disclosure tests for regression of ML models used for inference jobs. In some examples, the regression detection framework can be executed within the enterprise system 204 and/or the cloud platform 206 to test ML models that had been trained based on an earlier version (e.g., V1) of a ML application, but prior to production use of a newer version (e.g., V2) of the ML application. For example, the enterprise system 204 can include one or more modules that execute functionality of the regression detection framework, as described herein. As another example, the cloud platform 206 can include one or more modules that execute functionality of the regression detection framework, as described herein.

In some implementations, and as described in further detail herein, the regression detection framework executes a set of test inference jobs for each customer of a set of customers that use the ML application. In some examples, a test file is provided for each customer and defines a set of test inference jobs that are to be executed using one or more ML models of the respective customer. In some examples, the test file for a respective customer is provided from the customer using the customer system 202. In some examples, the test file for a respective customer is provided from the software vendor (i.e., the software vendor that provides the ML application) from a vendor system (not depicted in FIG. 2). The test inference jobs for a respective customer are executed and a metric is provided that indicates whether regression has occurred in a respective ML model. In some implementations, a report is provided that indicates an outcome of the regression testing for the respective customer (e.g., a set of score-model pairs).

As described in further detail herein, the regression detection framework calculates a prediction score (S), which is a metric that represents an accuracy of a ML model after a version change of the ML application. The prediction score is determined based on results of execution of a respective test scenario defined within a regression test file directory. In some examples, the prediction score can be calculated for each ML model in disparate sets of ML models (e.g., sets of ML models corresponding to respective customers). That is, the regression framework of the present disclosure enables all ML models across all customers that use the ML application to be tested for regression in a time- and resource-efficient manner. As described herein, the regression detection framework of the present disclosure functions as an early detection system that ensures backwards compatibility (e.g., a ML model is able to run on older versions (or even newer versions) of a ML application, for ML models when a new version is introduced to the ML application).

In accordance with implementations of the present disclosure, a regression test file directory is provided, which is used to execute one or more test scenarios. In some implementations, the regression test file directory is read to determine whether all requisite test files are provided to execute the test scenario(s) (i.e., test inference job(s)). In the CashApp context, and for test inferences of matching invoices to bank statements, contents of the regression test file directory can include:

Bank Statements (e.g., test data provided in a .csv file)
Invoices (e.g., test data provided in a .csv file)
ML Models (e.g., a set of identifiers of customer-specific ML models provided in a metadata file, such as a .pkl file)
Expected Results (e.g., result data provided in a .json file, the result data being used to compare to actual results extracted from the test inference job)

Figure 3:
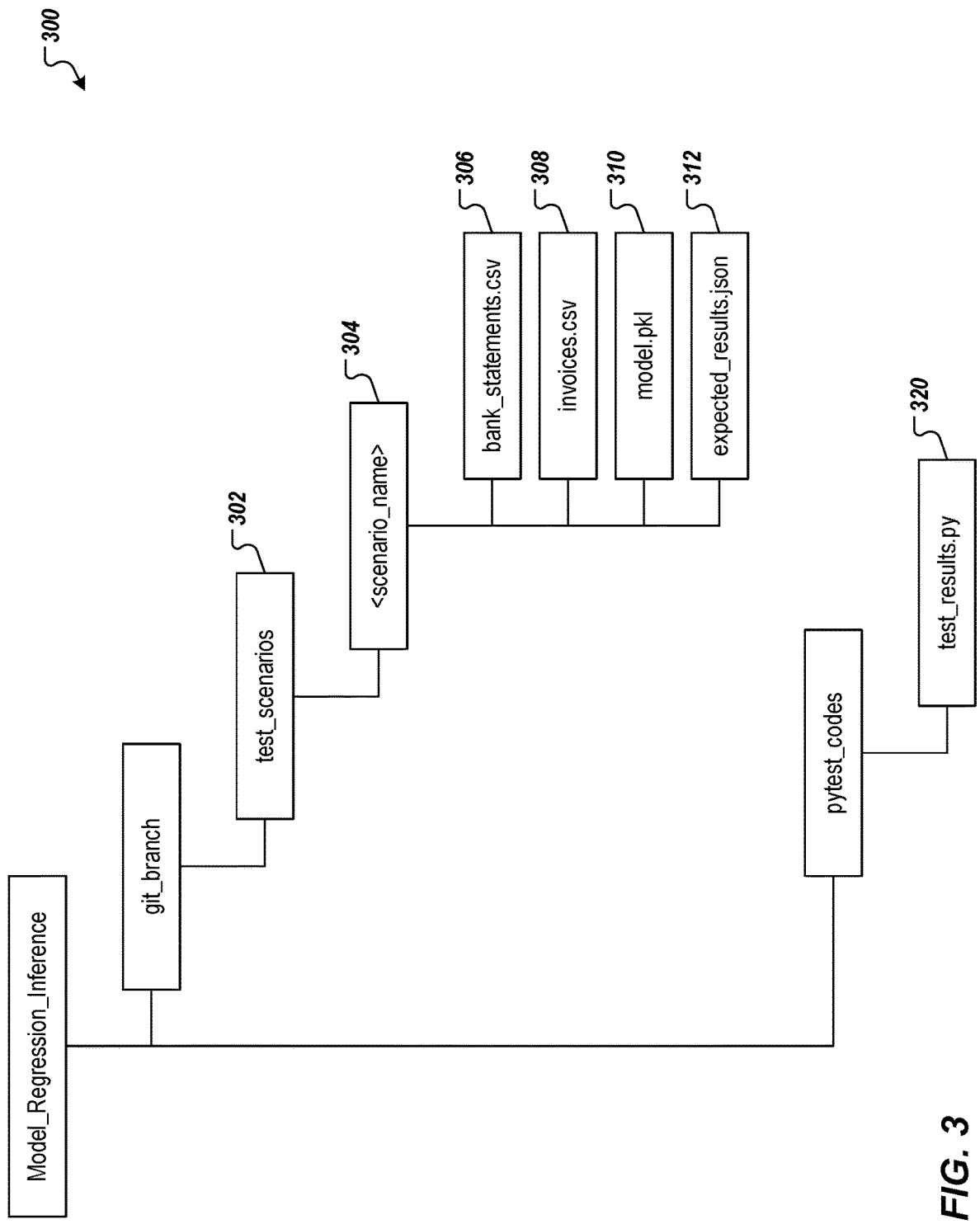
FIG. 3 depicts an example project structure for regression inference in accordance with implementations of the present disclosure.

FIG. 3 depicts an example project structure 300 for regression inference in accordance with implementations of the present disclosure. The example project structure 300 represents a regression test file directory that includes test files for regression testing in accordance with implementations of the present disclosure. In the example of FIG. 3, the project structure 300 includes a test scenarios sub-folder 302 and a scenario sub-folder 304, within which a set of test files is stored. In the example of FIG. 3, a single test scenario is represented (i.e., by the single scenario sub-folder 304). However, it is contemplated that multiple test scenarios can be defined within the regression test file directory, each test scenario corresponding to a respective scenario sub-folder 304.

In the example of FIG. 3, a set of test files represents the CashApp context and includes a bank statements file 306, an invoices file 308, a model file 310, and an expected results file 312. The bank statements file 306 and the invoices file 308 are to be provided as input to one or more ML models represented in the model file 310 to execute one or more inference jobs and generate actual results (e.g., predicted banks statement to invoice matches). The actual results are stored in a test results file 320.

As noted above, the regression test file directory is read to determine whether all files are present for performing the test inference job(s). In some examples, a list of required files can be provided for a given test scenario and files in the test scenarios sub-folder 302 can be compared to the list of required files to determine whether each required file is in the test scenarios sub-folder 302. If, for a given test scenario, all test files are included (i.e., in the test scenarios sub-folder 302), the test scenario is determined to be executable to generate a respective results file and a test inference job is scheduled for the test scenario. If, for a given test scenario, one or more test files are absent (i.e., in the test scenarios sub-folder 302), the test scenario is skipped (e.g., set as a fail) and a next test scenario represented in the regression test file directory, if any, is considered. This repeats until there are no more test scenarios left to consider in the regression test file directory (i.e., until all scenario sub-folders 304 have been considered).

In accordance with implementations of the present disclosure, for each test scenario that is validated (e.g., has all required files), a test inference job is transmitted for processing and includes the input files (e.g., bank statement file, invoice file) and model file. For example, the test inference job and files are sent to the cloud platform 206 through API calls to the application gateway API 240. In some implementations, the cloud platform 206 can be periodically polled for a status of the test inference job. If the test inference job is not completed, an update on the status of the test inference job and estimated time needed for completion are provided (e.g., in-progress—X minutes until completion). If the test inference job is complete, actual results are provided (e.g., as a json file). In some examples, the actual results are stored in the regression test file directory.

In some implementations, content of both the actual results (provided from the test inference job) and the expected results (provided in the regression test file directory for the test scenario) is read. In some examples, each actual result is compared to expected results to determine whether there is a match between the actual result and an expected result. In some examples, one or more keys of the actual result is compared to one or more keys of each of the expected results. In the context of CashApp, and as illustrated in further detail herein, an actual result can include a bank statement key that is matched to an invoice key to provide a key pair, and the key pair is compared to key pairs of the expected results to determine whether a match is present.

In the context of CashApp, and matching of bank statements (bs) to invoices (iv), an example actual results file can include the example of Listing 1 and an example expected results file can include the example of Listing 2, below:

```
{
    "bs-iv-results": [
        {
            "bs_key": "1",
            "iv_key": "a"
        },
        {
            "bs_key": "2",
            "iv_key": "b"
        },
        {
            "bs_key": "3",
            "iv_key": "c"
        },
        {
            "bs_key": "4",
            "iv_key": "d",
        }
    ]
}
```

Listing 1: Example Actual Results

```
{
    "overall-score": 0.9
    "bs-iv-results": [
        {
            "bs_key": "1",
            "iv_key": "a"
        },
        {
            "bs_key": "2",
            "iv_key": "b"
        },
        {
            "bs_key": "3",
            "iv_key": "c"
        },
        {
            "bs_key": "4",
            "iv_key": "d",
        }
        {
            "bs_key": "5",
            "iv_key": "e",
        }
    ]
}
```

Listing 2: Example Expected Results

As depicted in the example of Listing 2, the expected results also include an overall score. In some examples, the overall score represents an expected accuracy in output provided by the ML model. In some examples, the overall score is a known parameter determined for the respective ML model, representing an accuracy of the ML model for use of the ML model in V1 of the application.

In some implementations, the actual results are compared to the expected results to determine a correct number of predictions ($P_{corr}$). That is, for each prediction in the actual results that matches a prediction in the expected results, $P_{corr}$ is incremented by one (1). Using the examples of Listing 1 and Listing 2 above, $P_{corr}$ would be equal to four (4). That is, four of the actual results can be matched to a respective four of the expected results.

In some implementations, the prediction score (S) is determined based on $P_{corr}$, a total number of actual results ($A_{total}$), and a total number of expected results ($E_{total}$). In some examples, the prediction score (S) is determined using the following example relationship:

$$S = \frac{P_{corr}}{E_{total}}$$

In the examples of Listing 1 and Listing 2 above, $A_{total}$ is provided as the number of matched bank statements and invoices in the actual results file (e.g., 4), $E_{total}$ is provided as the number of matched bank statements and invoices in the expected results file (e.g., 5), and $P_{corr}$ is provided as the number matches of bank statement key and invoice key from the actual result file to the expected results file (e.g., 4). Consequently, the prediction score (S) for the examples of Listing 1 and Listing 2 is equal to 0.8.

For the given test scenario, the prediction score (S) is compared to the overall score (i.e., provided in the expected results) to determine whether regression is present. In this sense, the overall score can be considered a threshold score ($S_{THR}$). If the prediction score meets of exceeds the overall score, the test scenario is designated as PASS, which means that there is no regression issues for the particular ML model. If the prediction score is less than the overall score, the test scenario is designated as FAIL, which means that there is a regression issue with the ML model.

After a test scenario has been executed and PASS/FAIL designations are provided for the ML model(s) subject to the test scenario, it is determined whether there are further test scenarios to be processed. For example, it is determined whether another scenario sub-folder 304 is provided in the project structure 300. As noted above, this repeats until there are no more test scenarios left to consider in the regression test file directory (i.e., until all scenario sub-folders 304 have been considered).

After all of the test scenarios have been executed, the results are used to generate a report. For example, the results are read from the a test results file 320, which indicate, for each test scenario, a PASS or FAIL status. Test scenarios that have been determined as FAIL include an explanation as to why the test scenario failed (e.g., lack of content (files) needed to do inference, prediction score was less than the threshold score). In some examples, the report is provided as a web page (e.g., HTML page) that can be displayed to a user (e.g., an employee of a customer, for which the test scenario(s) executed) on a computing device. The report will show all the result of the test scenario after going through the test scenario. In some examples, report files are stored for future reference with other report files of other executed test scenarios.

In some examples, for any test scenarios indicating failure of a ML model (i.e., regression), one or more corrective actions can be taken. An example corrective action can be modification of the ML application to correct one or more issues that resulted in the regression (e.g., modify the code of V2 before production launch). Another example corrective action can include retraining of a failed ML model for V2 of the ML application.

Figure 4:
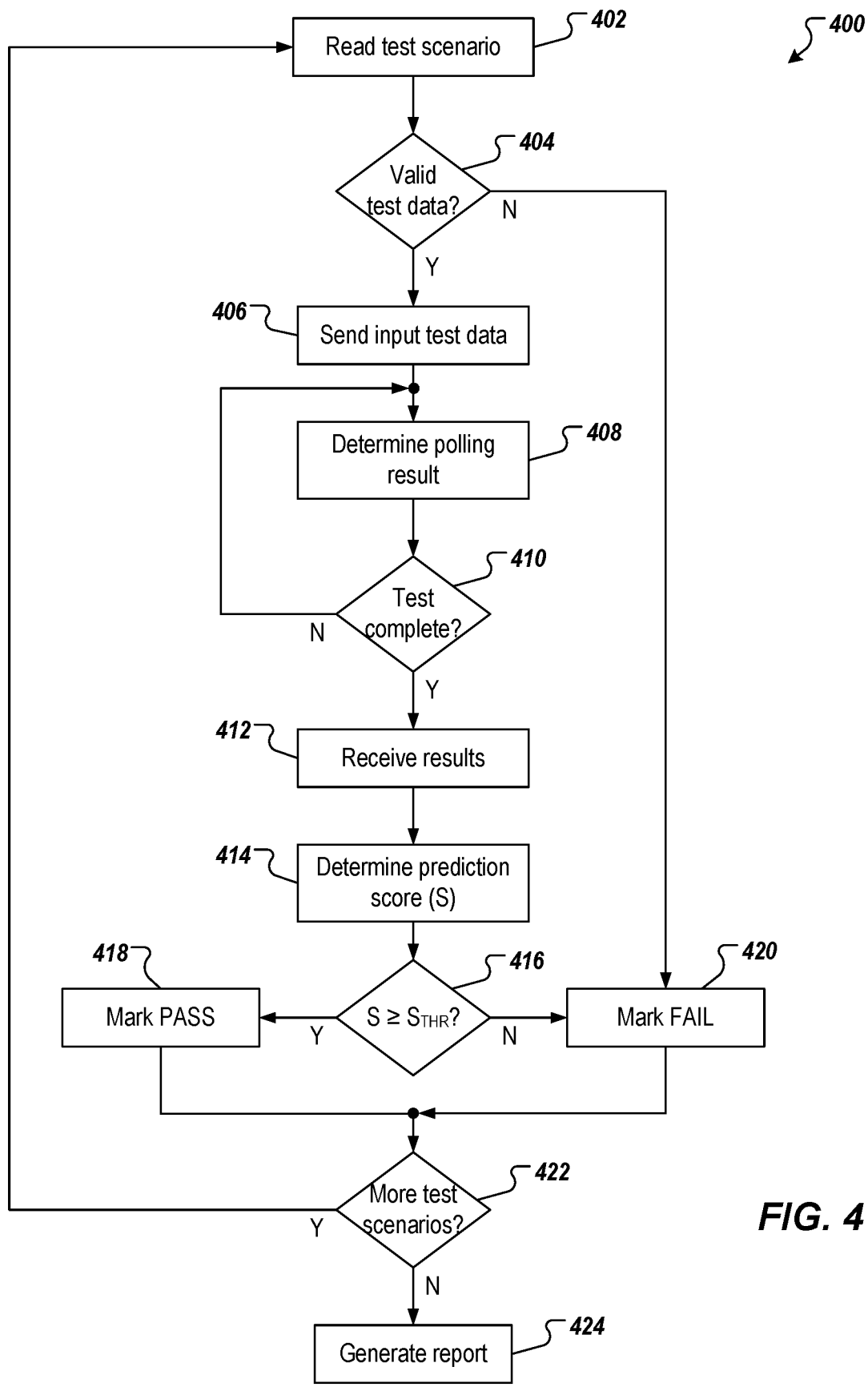
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices. In some examples, the example process 400 is executed for regression testing of ML models that are to be used by an application that is to move from a first version (V1), for which the ML models were trained, to a second version (V2). In some examples, the example process 400 is executed during a development phase of the second version, prior to use of the second version in a production phase.

A test scenario is read (402). For example, and as described herein, a regression test file directory is read to determine whether all files are present for performing the test inference job(s). It is determined whether the test scenario is valid (404). For example, and as described herein, a list of required files can be provided for a given test scenario and files in the test scenarios sub-folder 302 can be compared to the list of required files to determine whether each required file is in the test scenarios sub-folder 302. If the test scenario is not valid, the test scenario is marked as FAIL (420).

If the test scenario is valid, input test data is sent for processing (406). For example, if, for a given test scenario, all test files are included (i.e., in the test scenarios sub-folder 302), the test scenario is determined to be executable to generate a respective results file and a test inference job is scheduled for the test scenario. In some examples, and as described herein, a test inference job is transmitted for processing and includes the input files (e.g., bank statement file, invoice file) and model file. For example, the test inference job and files are sent to the cloud platform 206 through API calls to the application gateway API 240.

A polling result is determined (408) and it is determined whether the test scenario is complete (410). For example, and as described herein, the cloud platform 206 can be periodically polled (e.g., by the customer system 202, by a vendor system) for a status of the test inference job. If the test scenario is not complete, the example process 400 loops back. For example, if the test inference job is not complete, an update on the status of the test inference job and estimated time needed for completion are provided (e.g., in-progress—X minutes until completion).

If the test scenario is complete, results are received (412) and a prediction score is determined (414). For example, and as described herein, the actual results are compared to the expected results to determine a correct number of predictions ($P_{corr}$). That is, for each prediction in the actual results that matches a prediction in the expected results, $P_{corr}$ is incremented by one (1). In some implementations, the prediction score (S) is determined based on $P_{corr}$, a total number of actual results ($A_{total}$), and a total number of expected results ($E_{total}$).

It is determined whether the prediction score meets or exceeds a threshold score (416). For example, and as described herein, for the given test scenario, the prediction score (S) is compared to the overall score (i.e., provided in the expected results) to determine whether regression is present. In this sense, the overall score can be considered a threshold score ($S_{THR}$). If the prediction score meets or exceeds the threshold score, the test scenario is marked as PASS (418). If the prediction score does not meet or exceed the threshold score, the test scenario is marked as FAIL (420).

It is determined whether there is an additional test scenario to consider (422). For example, and as described herein, a next test scenario represented in the regression test file directory, if any, is considered. This repeats until there are no more test scenarios left to consider in the regression test file directory (i.e., until all scenario sub-folders 304 have been considered). If there is an additional test scenario to consider, the example process 400 loops back. If there is not an additional test scenario to consider, a report is generated (424) and is provided for review.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for regression detection in machine learning (ML) models resulting from version changes in an application leveraging the ML models, the method being executed by one or more processors and comprising:

receiving a project structure representing a regression test file directory for regression inference and comprising a set of test scenarios, the test file directory comprising a ML model file indicating one or more ML models to be tested for regression, one or more input files storing input data to be input to the one or more ML models during regression inference, an expected results file, and a test results file;

determining that a test scenario of the set of test scenarios is to be executed by validating the test scenario in view of the test file directory;

executing a test inference job using a second version of the application by processing input data of the one or more input files through the one or more ML models to provide a set of actual results comprising output of the one or more ML models, the test inference job representing the test scenario and comprising matching, by each of the ML models, target items and query items defined in the input data to generate the set of actual results;

receiving the set of actual results of the test inference job;

calculating a prediction score based on the set of actual results and a set of expected results of the test scenario, the set of expected results being defined in the expected results file and comprising an overall score of the ML models for a first version of the application; and selectively indicating regression of the one or more ML models of the test scenario based on the prediction score and the overall score.

2. The method of claim 1, wherein determining that a test scenario of the set of test scenarios is to be executed comprises determining that a set of files for execution of the test scenario is complete.

3. The method of claim 1, wherein the results file stores results data that is expected to be output by the one or more ML model for the test scenario.

4. The method of claim 1, wherein each test scenario in the set of test scenarios is specific to a respective entity, the one or more ML models being trained on entity-specific training data for a first version of the ML application.

5. The method of claim 1, wherein calculating a prediction score based on the actual result and an expected result of the test scenario comprises determining a correct number of predictions by comparing actual results in the set of actual results to expected results in the set of expected results, the set of expected results being defined in the test scenario.

6. The method of claim 1, wherein selectively indicating regression of the one or more ML models of the test scenario based on the prediction score comprises comparing the prediction score to the overall score that is included in the set of actual results.

7. The method of claim 1, wherein the test inference job is executed prior to production use of the second version of the application.

8. A non-transitory computer-readable storage medium coupled to one or more processors and having instructions stored thereon which, when executed by the one or more processors, cause the one or more processors to perform operations for regression detection in machine learning (ML) models resulting from version changes in an application leveraging the ML models, the operations comprising:

receiving a project structure representing a regression test file directory for regression inference and comprising a set of test scenarios, the test file directory comprising a ML model file indicating one or more ML models to be tested for regression, one or more input files storing input data to be input to the one or more ML models during regression inference, an expected results file, and a test results file;

determining that a test scenario of the set of test scenarios is to be executed by validating the test scenario in view of the test file directory;

executing a test inference job using a second version of the application by processing input data of the one or more input files through the one or more ML models to provide a set of actual results comprising output of the one or more ML models, the test inference job representing the test scenario and comprising matching, by each of the ML models, target items and query items defined in the input data to generate the set of actual results;

receiving the set of actual results of the test inference job;

calculating a prediction score based on the set of actual results and a set of expected results of the test scenario, the set of expected results being defined in the expected results file and comprising an overall score of the ML models for a first version of the application; and selectively indicating regression of the one or more ML models of the test scenario based on the prediction score and the overall score.

9. The computer-readable storage medium of claim 8, wherein determining that a test scenario of the set of test scenarios is to be executed comprises determining that a set of files for execution of the test scenario is complete.

10. The computer-readable storage medium of claim 8, wherein the results file stores results data that is expected to be output by the one or more ML model for the test scenario.

11. The computer-readable storage medium of claim 8, wherein each test scenario in the set of test scenarios is specific to a respective entity, the one or more ML models being trained on entity-specific training data for a first version of the ML application.

12. The computer-readable storage medium of claim 8, wherein calculating a prediction score based on the actual result and an expected result of the test scenario comprises determining a correct number of predictions by comparing actual results in the set of actual results to expected results in the set of expected results, the set of expected results being defined in the test scenario.

13. The computer-readable storage medium of claim 8, wherein selectively indicating regression of the one or more ML models of the test scenario based on the prediction score comprises comparing the prediction score to the overall score that is included in the set of actual results.

14. The computer-readable storage medium of claim 8, wherein the test inference job is executed prior to production use of the second version of the application.

15. A system, comprising:

a computing device; and a computer-readable storage device coupled to the computing device and having instructions stored thereon which, when executed by the computing device, cause the computing device to perform operations for regression detection in machine learning (ML) models resulting from version changes in an application leveraging the ML models, the operations comprising:

receiving a project structure representing a regression test file directory for regression inference and comprising a set of test scenarios, the test file directory comprising a ML model file indicating one or more ML models to be tested for regression, one or more input files storing input data to be input to the one or more ML models during regression inference, an expected results file, and a test results file;

determining that a test scenario of the set of test scenarios is to be executed by validating the test scenario in view of the test file directory;

executing a test inference job using a second version of the application by processing input data of the one or more input files through the one or more ML models to provide a set of actual results comprising output of the one or more ML models, the test inference job representing the test scenario and comprising matching, by each of the ML models, target items and query items defined in the input data to generate the set of actual results;

receiving the set of actual results of the test inference job;

calculating a prediction score based on the set of actual results and a set of expected results of the test scenario, the set of expected results being defined in the expected results file and comprising an overall score of the ML models for a first version of the application; and selectively indicating regression of the one or more ML models of the test scenario based on the prediction score and the overall score.

16. The system of claim 15, wherein determining that a test scenario of the set of test scenarios is to be executed comprises determining that a set of files for execution of the test scenario is complete.

17. The system of claim 15, wherein the results file stores results data that is expected to be output by the one or more ML model for the test scenario.

18. The system of claim 15, wherein each test scenario in the set of test scenarios is specific to a respective entity, the one or more ML models being trained on entity-specific training data for a first version of the ML application.

19. The system of claim 15, wherein calculating a prediction score based on the actual result and an expected result of the test scenario comprises determining a correct number of predictions by comparing actual results in the set of actual results to expected results in the set of expected results, the set of expected results being defined in the test scenario.

20. The system of claim 15, wherein selectively indicating regression of the one or more ML models of the test scenario based on the prediction score comprises comparing the prediction score to the overall score that is included in the set of actual results.

* * * * *